United States Patent

Bergin

[15] 3,701,145

[45] Oct. 24, 1972

[54] ANALOG TO DIGITAL CONVERTER

[72] Inventor: William P. Bergin, Philadelphia, Pa.

[73] Assignee: Honeywell Inc., Minneapolis, Minn.

[22] Filed: Nov. 4, 1970

[21] Appl. No.: 86,766

[52] U.S. Cl. .......340/347 NT, 235/150.53, 235/154, 340/172.5

[51] Int. Cl. .........G06f 5/00, H03k 13/02, H041 3/00

[58] Field of Search..340/347 AD, 347 DD, 172.5 B, 340/347 NT; 235/154, 152 IE, 151.11 I, 150.53

[56] References Cited

UNITED STATES PATENTS

| | | | |
|---|---|---|---|
| 2,922,990 | 1/1960 | Anderson | 340/172.5 |
| 2,987,704 | 6/1961 | Gimpel et al. | 340/172.5 |
| 3,248,726 | 4/1966 | Sonnenfeldt | 235/92 R X |
| 3,051,939 | 8/1962 | Gilbert | 340/347 AD |
| 3,316,547 | 4/1967 | Ammann | 340/347 AD |

*Primary Examiner*—Maynard R. Wilbur
*Assistant Examiner*—Thomas J. Sloyan
*Attorney*—Arthur H. Swanson and Lockwood D. Burton

[57] ABSTRACT

An integrating analog to digital conversion apparatus includes means whereby a non-linear input variable is time integrated for a fixed period of time. A fixed reference source of opposite polarity to said input variable is then time integrated for a variable second period of time. The second variable time period being registered in a digital pulse counter, whereby the digital output of the counter at the termination of the second time period is representative of the value of the input variable. The apparatus includes addressable memory means having stored therein digital correction data, control network means for transferring digital data between elements of the apparatus, arithmetic means for modifying, in singular bit fashion, the digital output of the pulse counter in order to effect digital linearization of the non-linear input variable. Secondary counter means operationally stores within itself the resultant modified singular data bits, whereby the digital output of the secondary counter means is representative of the linearized value of the non-linear input variable.

14 Claims, 2 Drawing Figures

INVENTOR.
WILLIAM P. BERGIN
BY Lockwood D. Burton
ATTORNEY.

INVENTOR.
WILLIAM P. BERGIN
BY Lockwood D. Burton
ATTORNEY.

ANALOG TO DIGITAL CONVERTER

The present invention relates to electrical apparatus and, more particularly to analog to digital converters which linearize process variables of a non-linear nature.

In the art relating to digital linearization of analog variables, there have been heretofore provided numerous systems for digitizing a non-linear analog output signal from a sensing device, such as a thermocouple, and then correcting the digitized output by the addition of a correction factor found by searching through a tabulated list of such factors. These prior devices have been relatively complex in their circuitry and have required critical components having critical tolerances in their circuit design. Because of the complexity and critical tolerances of the prior art those systems are therefore quite costly.

It is an object of the present invention to provide a substantially low cost means for and method of digitizing and linearizing a non-linear analog input variable signal.

A further object of this invention is to provide an improved a/d converter which is characterized by minimized circuit design and complexity and still provide the desired accuracy for the operation of the apparatus.

In accomplishing these and other objects there has been provided, in accordance with the present invention, an analog-to-digital converter comprising means for integrating, in a first instance, over a fixed period of time, an analog input signal which is a nonlinear variable with respect to a primary variable of which the analog signal is a measure; switching means by which a fixed reference input of opposite polarity is then integrated over a variable period of time in a second instance; and counting means by which the variable time is measured in a digital format. The digital representation of that variable time is exactly proportional to an accurate value of the original nonlinear analog input signal to the system. There is also provided linearizing means by which the aforesaid digital representation of the input signal is modified to constitute the desired linearized digital value which is linearly representative of the primary variable.

The linearization means comprises an addressable memory in which is stored the appropriate digital correction data for each of a given number of values of the output of the counting means. The selected correction data is then added to or subtracted from the counter means output signal by singular bit arithmetic means. After all the bits of the counter means output have been modified by the arithmetic means, the bits are stored as one word in a secondary counter means. That stored digital word is representative of a linearized input variable. The word stored in the secondary counter means is then converted to a binary coded decimal format which may be used to drive an appropriate visual indicator mechanism.

A better understanding of this invention may be had from the following detailed description when considered with the accompanying drawing, in which.

Figure 1:
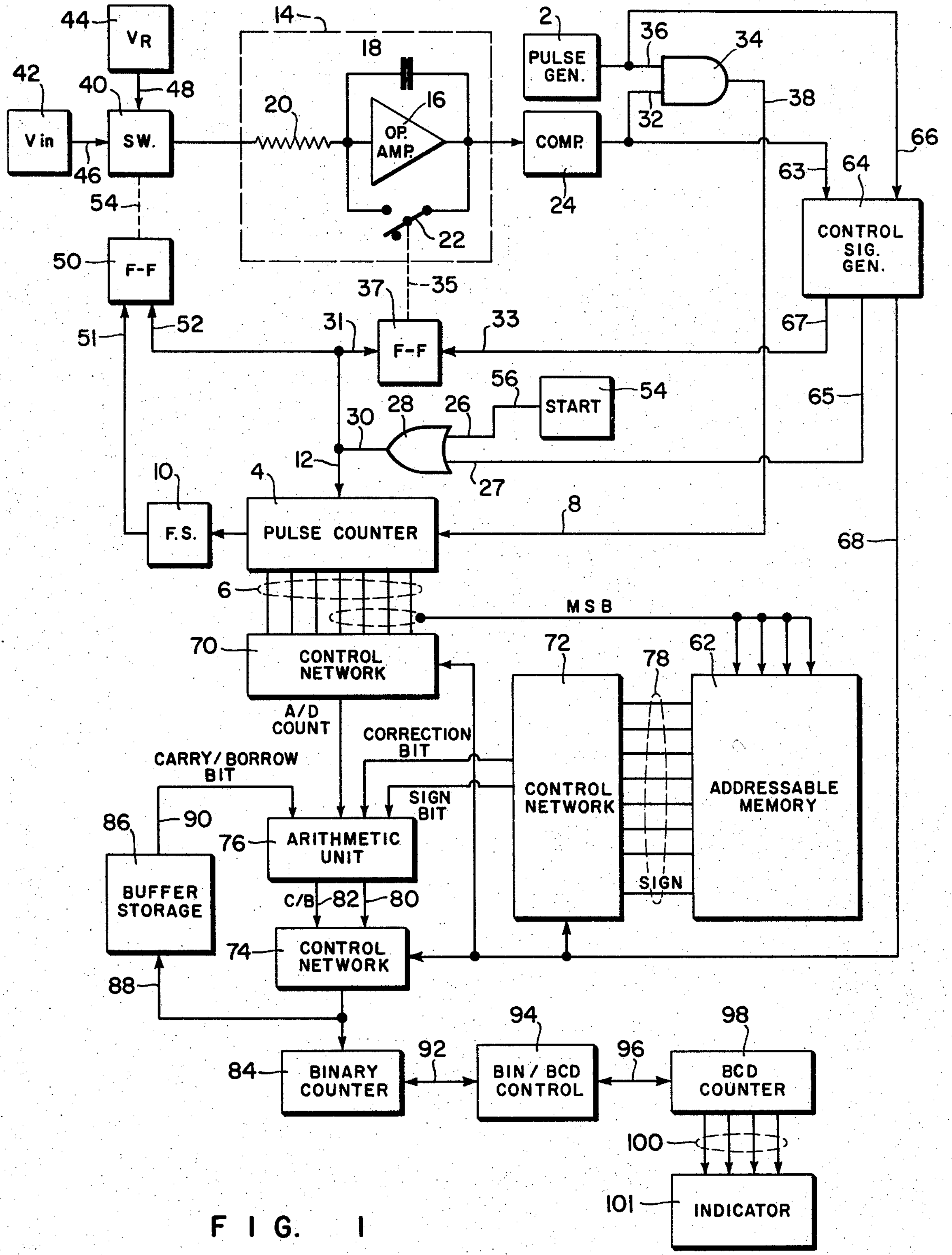
FIG. 1 is a block diagram of a preferred embodiment of an analog-to-digital conversion system according to the present invention.

Referring now to FIG. 1 a preferred embodiment of an integrating analog to digital linearizer includes a pulse generator 2, such as a free running crystal oscillator, free running multivibrator, or similar pulse generating means for producing a series of equally time-spaced pulses. A pulse counter 4 of a generally conventional type is provided which produces a digital output, as generally indicated at 6, in the form of, for example binary coded decimal electrical output signals or, in the preferred embodiment of the invention, a straight electrical binary code. This output constitutes a digital representation of the number of pulses applied to the counter input 8 from the pulse generator 2. The pulse counter is further provided with a full scale output 10 at which a pulse is generated in response to a full scale count being registered at the digital output 6. The counter includes a reset input 12 which is arranged such that in response to the appearance of a pulse thereon, the counter is set to zero.

Transmission of pulses from the pulse generator 2 to the input 8 of pulse counter 4 is regulated according to the integrated output of an integrating circuit 14 in a manner to be described in detail hereinafter. The integrating circuit preferably comprises an operational amplifier 16 having a feedback capacitor 18 coupled between its output and input, and a resistor 20 in series with its input. It will be appreciated that the integrating circuit is of conventional design; an explanation of its operation is not needed since it is well known. In order to regulate the integrating time interval, the integrating circuit 14 is preferably provided with a switch 22, which may be either mechanical or electronic, connected in parallel with the capacitor 18. When the switch 22 is in its open position as depicted in FIG. 1, the capacitor 18 is operatively associated with the amplifier and the integrating circuit is thus activated to generate an output signal representative of the time integral of an applied input signal. When the switch 22 is in its closed position, however, the capacitor 18 is shorted and the integrating circuit is conditioned to be inoperative such that no output signal is produced irrespective of the input to the integrating circuit.

Provision is made to initiate transmission of pulses from the pulse generator 2 to the input 8 of the pulse counter 4 in response to the integrated output of the integrating circuit 14 being at a predetermined threshold level. Pulse transmission is continued as long as the integrated output deviates from the threshold level in a given direction. Pulse transmission is terminated in response to the integrated output signal reversing direction and passing through this threshold level, return of the integrated output signal to the threshold being effected by the application of a reference signal to the input of the integrating circuit with a polarity opposite from that of the first input signal in a manner subsequently to be described.

In the illustrated embodiment of the present invention, a level comparator 24 is coupled to the output of the integrating circuit 14. The comparator 24 is arranged to generate an output gate pulse whenever the output signal of the integrating circuit passes through a predetermined threshold level in a given direction. The pulse thus generated continues until such time as the integrated output signal passes through the threshold level in the opposite direction. The output of the comparator 24 is, in turn, commonly connected in triggering relation to an input 32 of an AND gate 34 and an input 63 of a control signal generator 64. A second input 36 of the gate 34 is connected in receiving relation to the output of the pulse generator 2. The output 38 of the gate 34 is connected in energizing relation to the input 8 of the pulse counter 4. The AND gate 34 is open in response to a gate pulse from the comparator 24 and thus permits transmission of pulses from the pulse generator 2 to the pulse counter input 8 for the duration of such gate pulse. In the absence of the gate pulse from the comparator 24, however, the gate 34 is closed and, therefore, the output pulses of the pulse generator 2 are prevented from passing to the pulse counter input 8.

A switch 40 is provided to control the application of input signals to the input of the integrating circuit 14. In particular, such a switch is arranged to apply a first, or variable signal to the integrating circuit followed by the application of a second, or reference signal of opposite polarity. This switch 40, which may be either mechanical or electronic, is preferably coupled to the input of the integrating circuit 14. The analog signal source 42 and the reference signal source 44 have opposite polarity terminals connected respectively to the terminals 46 and 48 of the switch. In one position of the switch, the terminal 46 is connected to the input of the integrating circuit to thereby apply the signal from the analog source as input thereto; whereas in another position of the switch, the terminal 48 is connected to the integrating circuit input to thereby apply the signal from the reference source. The switch 40 is preferably controlled by means of a flip-flop 50 having a set input 51 connected to the full scale output 10 of the pulse counter 4 and a reset input 52 energized as described below. The output of the flip-flop 50 is coupled in controlling relation to the switch 40 as indicated by the dashed line 54. In the reset state of the flip-flop 50 which is effected in response to energization of the reset input 52, the switch 40 is respectively positioned to connect the terminal 46 to the integrating circuit input, thereby applying the signal from the analog source 42. In the set state of the flip-flop 50, which is effected responsive to a full scale indicating pulse being applied to the set input 51 of the flip-flop 50 from the full scale output 10 of the counter, switch 40 is positioned to connect the terminal 48 to the integrating circuit input and thereby applying to it the signal from reference source 44. Thus, the application of the reference signal to the input of the integrating circuit 14 is effected in response to a full scale output of the pulse counter 4.

In order to provide proper functioning for the converter portion of the system during subsequent cycles of operation, provision is made to periodically reset the converter prior to the initiation of each subsequent cycle of operation. It is necessary to reset the pulse counter 4 to a predetermined starting count, reset the switch 40 it its position connecting the terminal 46 to the input of the integrating circuit 14, and to reset the switch 22 to its closed position, all prior to the time another cycle of operation is initiated in response to opening of the switch 22. Start means 54 is therefore provided with an output 56 connected to an input 26 of the OR gate 28. A second input 27 of the OR gate 28 is connected in receiving relation to the reset output 65 of the control signal generator 64. The output 30 of the OR gate 28 is commonly connected to the reset input 52 of the flip-flop 50, the reset input 12 of the pulse counter 4 and the reset input 31 of a flip-flop 37. In response to a level change pulse transmitted from the comparator 24 to the input 63 of the control signal generator 64, a hold pulse is generated at the output 67 of said control signal generator 64. This hold pulse is operable, by means of the flip-flop 37, to condition the switch 22 to its closed or shorted position. The output 67 of control signal generator 64 is connected to the input 33 of the flip-flop 37. The output 35 of the flip-flop 37 is operable to condition the switch 22 to either its open or shorted position, dependent upon the signal status of the reset input 31 or the set input 33. If, for example, the converter is being started for the very first time, the start means 54 is operative to transmit a start pulse by way of the input 26 of the OR gate 28 to responsively energize the output 30 of the said OR gate 28 to simultaneously condition (1) the reset input 12 of pulse counter 4 to reset the said counter 4 to a predetermined starting count, (2) the reset input 52 of the flip-flop 50 to actuate the switch 40 to its position connecting terminal 46 to the integrating circuit input and (3) the reset input 31 of the flip-flop 37 to actuate the switch 22 to its open position. Therefore, upon initiation of the start up procedure, the switch 22 is maintained in the open position and the converter is permitted to start integrating immediately. If, on the other hand, the converter has just completed a cycle of operation, a reset pulse may be present at the output 65 of the control signal generator 64. The input 27 of the OR gate 28 is connected in receiving relation to the output 65 of the control signal generator 64 and, in response to a reset pulse, will condition the output 30 of the OR gate 29 to energize the reset input 52 of the flip-flop 50 the reset input 12 of the pulse counter 4, and the reset input 31 of flip-flop 37 to respond in an identical manner described above when a start pulse was present.

In either case, whether the converter is initially started or the system has just completed a cycle of operation, the device is once more ready to integrate the analog input 42. It is assumed that the analog input 42 always starts at some level greater than the threshold level. This is due to the existence of minor offset voltages and delay times inherent in the comparator switching network. Once the integrating circuit 14 becomes operative and begins to integrate the analog input, the comparator 24 will detect the crossing of the predetermined threshold level and will simultaneously open the AND gate 34 and maintain the same open until the comparator 24 once again crosses the threshold level in the opposite direction and switches the AND gate 34 OFF. The transmission of pulses from the pulse generator 2 to the counter 4 is thus initiated simultaneously with the time integral of an input signal being at a predetermined threshold level. Such predetermined level may be, for example, the zero level.

When the time integral of the second input signal passes through zero level, the comparator 24 generates an output pulse which is, in turn, applied to the input 32 of the AND gate 34 to terminate the transmission of pulses from the pulse generator 2 to the pulse counter 4. The count appearing at the digital output 6 at that time is thus representative of the ratio of the time integral of the two input signals. That output pulse from the comparator 24 is also simultaneously applied to the input 63 of the control signal generator 64. The control signal generator 64 is conditioned responsive to a pulse on the input 63 such that a hold pulse is generated at the output 67. The flip-flop 37 is then operatively responsive to the hold pulse at the input 33 and will condition the switch 22 to its closed position. Closing the switch 22 also insures that the next integration starts from zero (the capacitor 18 is shorted). The digital output 6 of the pulse counter 4 is comprised of "M" most significant data bits and "N" least significant data bits. An addressable memory means 62 is connected in receiving relation to the M most significant data bits of the digital output 6 of pulse counter 4. The memory 62 has an address capability of $2_M$ combinations, each combination having at its address location a data correction word. Each data correction word comprises a plurality of data correction bits, and the value of these data correction bits is constant over a range of $2_N$ consecutive states of the pulse counter 4. These data correction bits are arranged in an orderly sequence consisting of a sign bit in the first sequential position consecutively followed by the remainder of the data correction word beginning first with the least significant data correction bit and ending with the most significant data correction bit.

A control signal generator 64 is coupled in receiving relation to the pulse generator 2 by means of a control signal generator input 66. The output 68 of said control signal generator 64 is simultaneously connected in energizing relation to control networks 70, 72, and 74. In the preferred embodiment of the present invention, the control signal generator 64 comprises a plurality of flip-flops and gates. These flip-flops and gates are operatively designed to count and decode the input pulses from the pulse generator 2 and to distribute the appropriate pulses to the control networks 70, 72 and 74 in order that proper sequencing and timing be maintained throughout the linearizing system. Control network 70 is coupled in receiving relation to the digital output 6 of the pulse counter 4. Upon receiving the proper output pulse from the control signal generator output 68, the control network 70 will be operatively energized to transfer the digital output 6 of the pulse counter 4 to an arithmetic unit 76 in singular bit order beginning first with the least significant bit of the digital output 6. Control network 72 is coupled in receiving relation to the output 78 of the addressable memory 62, said output 78 comprising a plurality of data correction bits, the first bit of which is designated the sign bit. Upon receiving the correct control pulse from the control signal generator output 68, the control network 72 will be operatively energized to transfer to the arithmetic unit 76 the digital output 78 of the addressable memory 62 in singular bit order, beginning with the sign bit. The control network 72 includes means operable to condition the arithmetic unit 76 to selectively add or subtract depending upon the instruction of the sign bit.

The arithmetic unit 76 comprises a one bit adder and a one bit subtracter, having a digital sum or difference output 80 and a digital carry/borrow output 82. The control network 74 is coupled in receiving relation to the outputs 80 and 82 of the arithmetic unit 76, upon proper application of a control pulse from the control signal generator output 68, the control network 74 will transfer the singular bit sum or difference from arithmetic unit output 80 into a binary counter 84. Simultaneously, the control network 74 will also transfer the carry/borrow singular bit output 82 of arithmetic unit 76 into buffer storage 86 by means of buffer storage output 90. The buffer storage output 90 is operationally coupled to an input of arithmetic unit 76. Upon application of the appropriate control pulse from control network 74, the buffer storage output 90 will shift the stored carry/borrow bit into the arithmetic unit 76 for the succeeding cycle of operation.

In order that a fuller and better understanding of the timing and operational sequencing of the linearizing system may be given, a complete cycle of linearizing operation for a singular bit is herewith described. The non-linear input variable 42 is represented by the digital output 6 of the pulse counter 4 in the form of (M+N) data bits. The M most significant data bits of the digital output 6 instantaneously address the memory 62 and thereby instruct the memory 62 to produce at its output 78 the digital representation of the selected data correction word. Upon application of the proper pulse output from the control signal generator 64, the linearizing system is instructed to simultaneously: (1) operationally energize control network 72 to transfer the sign bit and the least significant bit from the data correction word 78 to the arithmetic unit 72; (2) operationally energize control network 70 to transfer the least significant bit of digital output 6 into the arithmetic unit 76; and (3) energize control network 74 to shift into the buffer storage input 88 any preceding carry/borrow data bit and to shift out of the buffer storage output 90 and into arithmetic unit 76 the previously stored carry/borrow data bit. The arithmetic unit 76 then selectively adds or subtracts in singular bit fashion, depending upon the instruction of the aforesaid sign bit (1) the least significant bit from the digital output 6, (2) the least significant bit from the data correction word of the memory output 78 and (3) the carry/borrow data bit from the buffer storage 86. The resultant singular bit sum or difference from the arithmetic unit output 80 is then transferred by means of control network 74 to the least significant data bit position of the binary counter 84 and the carry/borrow data output 82 from arithmetic unit 76 is then transferred by means of the control network 74 to the buffer storage 86 for the succeeding cycle of singular bit arithmetic operation. Subsequent cycles of arithmetic operations are performed on the remaining data bits with the most significant data bit of digital output 6 of pulse counter 4 being linearized in the final operation. Binary counter 84 having digital output 92 now contains the complete linearized digital system input variable in a binary format.

In a preferred embodiment of the present invention, the final form desired for the representation of the input variable is a binary coded decimal (BCD). To that end, therefore, there has been provided a binary/BCD control circuit 94 having an output 96 coupled in energizing relation to a BCD counter 98. The control circuit 94 is operationally connected to the binary counter 84 by means of a counter output 92. The binary counter 84 counts down to zero from the count stored therein. Simultaneously, the control circuit 94 is operationally connected by means of the output 96 to the BCD counter 98 and allows the BCD counter 98 to continue to count up from zero until such time as the binary counter 84 reaches zero count. The BCD counter 98 will then contain the BCD equivalent of the digital number which was in the binary counter 84 when the conversion was first initiated. The digital representation in BCD format of the complete linearized system variable will then be presented at the BCD counter output 100. The BCD counter output 100 may then be used to drive, for example, such an indication device as a multi-segment decimal indicating means 101.

Figure 2:
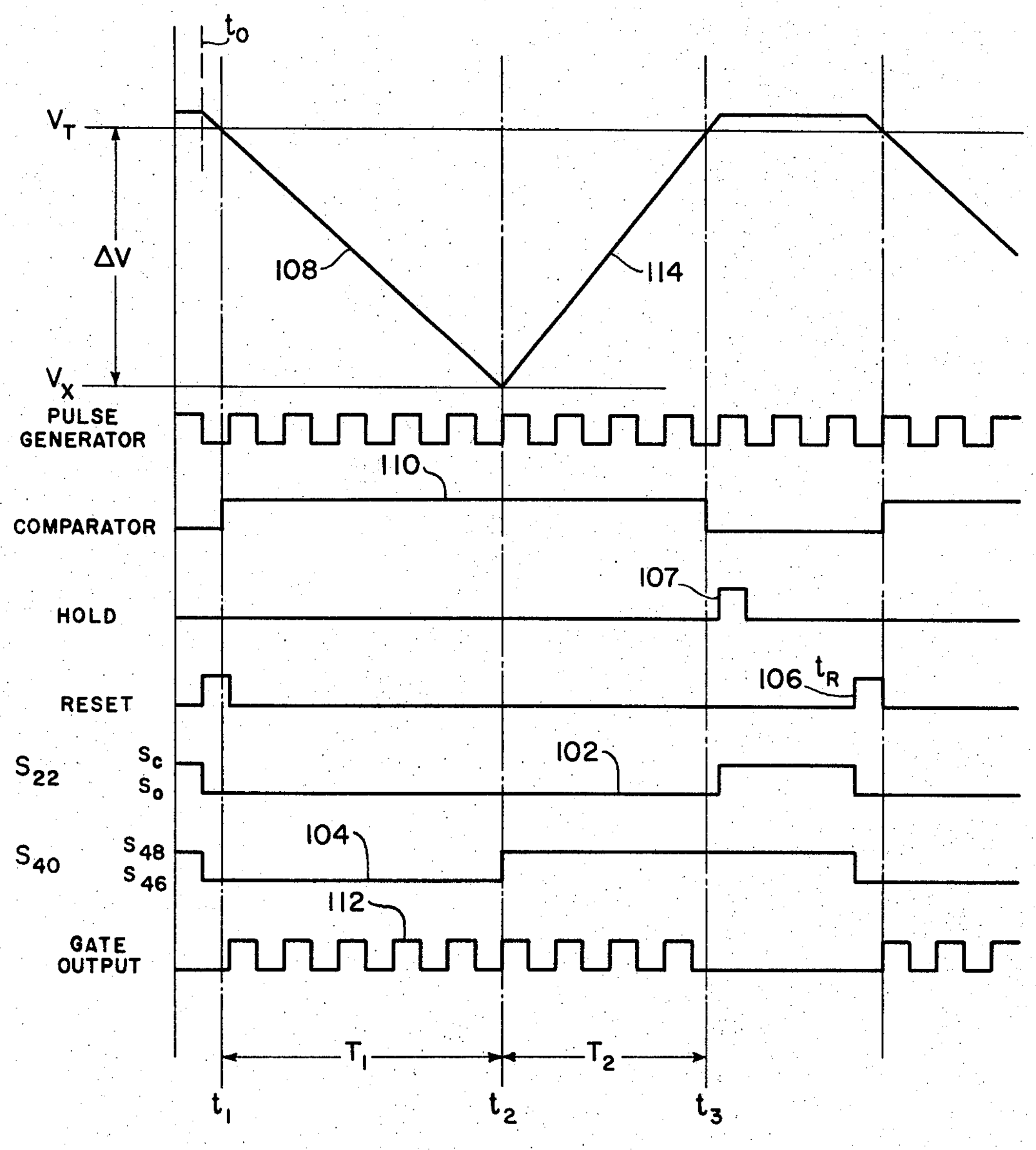
FIG. 2 is a graphical presentation of waveforms at various points within the analog-to-digital converter.

Considering now the analog to digital conversion of the circuit of FIG. 1, the analog signal source 42 applies a DC signal of constant level $V_1$ to the terminal 46 of switch 40, while reference signal source 44 applies a second DC signal of opposite polarity and of a level $V_2$ to the terminal 48 of switch 40. Reference is now made to FIG. 2 showing related waveforms existing at various points of this circuit under such input signal conditions. Waveform 102 represents the conditions of switch 22, while waveform 104 represents the condition of switch 40. Initially, switch 22 is in its closed position $S_c$ and switch 40 is in its position $S_{48}$ wherein the switch terminal 48 is connected to the input of the integrating circuit 14. These initial switch conditions prevail upon completion of an operating cycle of the circuit prior to the time a reset pulse 106 is generated by the control signal generator 64. Upon the generation of such reset pulse 106, at the time $t_R$ (Time of the leading edge of pulse 106), the reset input 12 of pulse counter 4, the reset input 52 of flip-flop 50 and the reset input 31 of flip-flop 37 are energized to thereby reset the circuit for a subsequent cycle of operation. The pulse counter is set to a predetermined start count which, in the preferred embodiment of the invention, will be taken as zero. The flip-flop 50 effects actuation of the switch 40 into positions $S_{46}$. In position $S_{46}$ of switch 40, the terminal 46 is connected to the input of integrating circuit 14 to thereby apply the signal $(+V_1)$. In response to the reset pulse 106 the OR gate 28 energizes the reset input 31 of the flip-flop 37 which thereby effects actuation of the switch 22 to its open position $S_o$. Thus, at time $t_o$, the integrating circuit 14 is actuated, while the input $(+V_1)$ is applied to its input. The time integral of the input signal $(+V_1)$ is generated at the output of the integrating circuit, and in the present instance, is a ramp signal 108 having a slope of $$(-V_1/RC)\,\mathrm{RC}$$

$R$ being the resistance of the resistor 20 and $C$ being the capacitance of the capacitor 18 of the integrating circuit 14. $RC$ is the time constant $t$, in units of time, of the above ramp generator. At a time $t_1$, the ramp signal 108 starts from a predetermined threshold level $V_t$ of the comparator 24. As noted previously, the comparator generates an output gate pulse 110 in response to levels of the integrated signal at its input which surpass the threshold level in a given direction. A comparator output pulse 110 is thus initiated at the time $t_1$ whereupon the AND gate 34 is opened. Thus, at a time $t_1$ a series of pulses 112 from the pulse generator 2 are transmitted through the AND gate 34 to the input gate of the pulse counter 4 and are thereby counted. After a period of time T1 extending from time $t_1$ to $t_2$, the pulses 112 have driven the digital output 6 of the pulse counter 4 to full scale, and a full scale indicating pulse is responsively applied from the counter output 10 to the set input of the flip-flop 50. The flip-flop 50 in turn actuates the switch 40 to its position $S_{48}$ wherein the terminal 48 is connected to the input of the integrating circuit 14 to apply the signal $V_2$ from the reference source 44 thereto. In response to the signal $V_2$, of opposite polarity to the signal $+V_1$, the time integral of signal $V_2$, in the present instance a ramp 114, is generated at the output of the integrating circuit. The ramp signal 114 has a slope $V_2/RC$ of opposite polarity to the ramp signal 108. The ramp signal 114 accordingly varies from a level $V_x$, attained by the ramp signal 108 at the time $t_2$, to the predetermined threshold level $V_T$ at a time $t_3$. The gate pulse 110 from the comparator 24 is at this time terminated as is, therefore, the transmission of the pulses 112 from the pulse generator 2 to the input 8 of the pulse counter. Simultaneously, the control signal generator 64 generates a hold pulse 107 at output 67 and the switch 22 is energized to its closed position $S_c$, thereby inactivating the integrating circuit. At that time, the digital output 6 of pulse counter registers a count of N pulses. These pulses have been registered in a time period $T_2$ extending from the time $t_2$ to $t_3$, inasmuch as at the time $t_2$ the counter has shifted from a full scale count to zero count. It should be noted that there is no fixed time between the generation of the hold pulse 107 and the reset pulse 106. This time is variable and provides an interruption in the integrating operation during which the linearizing portion of the converter may perform. The reset pulse 106 is generated only after the primary variable is completely linearized and the digital valve representative of that variable is recorded in the BCD counter 98.

It will be appreciated that the time period $T_1$ is related to the full scale count $F$ of pulse counter 4 and the pulse repetition rate $f_0$ of the pulse generator 2 by the following: $T_1 - F/f_0$. Similarly, the pulse count $N$ is related to the time period $T_2$ and the pulse repetition rate of $f_0$ by: $T_2 = N/f_0$. In addition, the difference $\Delta V$, between $V_x$ and level $V_T$ is given by:

$$\Delta V\ V_1\ T_1/RC$$

Upon substituting for $T_1$ $$\Delta V = V_{1F}/RCf_0$$

Similarly $$\Delta V = V_2 T_2/\mathrm{RC}$$

Rearranging the terms, $T_2$ is given by:

$$T_2 = \Delta V RC/V_2$$

Substituting from $V$ in the preceding expression $$T_2 = V_{1RCF}/v_1 \mathrm{RCF}_0 = V_1 F/V_2 f_0$$

Equating the foregoing expression to $T_2$, there is obtained:

$$V_1F/V_2f_o=N/f_0$$

Multiplying both sides of the equation by $f_o$, $N$ is accordingly expressed by:

$$N=(V_1/V_2)\ F$$

Thus, the count $N$ registered in the digital output 6 of the pulse counter 4 is representative of the ratio of the input signals $V_1$ and $V_2$ as well as to the ratio of the time integrals of these signals $V_1/t$ and $V_2/t$. It is of importance to note that the digital output $N$ is independent of all parameters of the converter circuit including the resistance $R$ and capacitance $C$ of the integrating circuit 14 and the repetition rate $f_0$ of the pulse generator 2.

Thus there has been provided an improved linearizing a/d converter which features accurate conversion and is of a simple and low cost construction.

The embodiments of the invention in which an exclusive property or privilege is claimed are defined as follows:

1. An integrating analog to digital converter for providing a linearized digital representation of an analog input signal which is a nonlinear representation of a primary variable, said converter comprising;
   - pulse generating means for generating a series of equally time spaced pulses;
   - pulse counter means for producing a digital output representative of the number of pulses applied to its input;
   - control gating means for selectively connecting the output of said pulse generating means to the input of said pulse counter means;
   - integrating means for generating an output signal representative of the time integral of the input signals applied thereto;
   - switching means for applying an analog input signal to said integrating means to produce a first integrated output signal;
   - comparator means responsively coupled to said integrating means for actuating said control gating means whereby initiating transmission of pulses from said pulse generating means to the input of said pulse counter means at the beginning of said integration of said first input signal; said counter means being driven from a predetermined starting count to a full scale count in a first time interval beginning at the time said first integrated output signal is at a threshold level, said first integrating output signal varying from said threshold level to a second level during said first time interval;
   - means responsive to a full scale count in said counter means for actuating said switching means to apply a second, or reference, signal to said integrating means, said reference signal being of opposite polarity with respect to said analog input signal; said integrating means being operative to produce a second integrated output signal in response to said second signal varying from said second level to said threshold level during a second time interval immediately following said first time interval; said comparator means coupled to said integrating means being further responsive to the return of said second integrated signal to said threshold value for actuating said control gate means for terminating transmission of pulses from said pulse generating means to said counter means at the termination of said second time interval whereby said digital output of said pulse counter means at the end of said second time interval is representative of the value of said analog input signal;
   - linearizing means comprising addressable memory means having a plurality of data correction words addressably stored therein;
   - means responsive to said digital output of said pulse counter means for addressing said memory means for selecting a corresponding one of said data correction words;
   - arithmetic means responsive to said digital output of said pulse counter means and of said selected data correction word for modifying said digital output in accordance with said data correction word; and
   - output storage means capable of having stored therein the modified digital output of said arithmetic means and being operative to provide a linearized representation of said primary variable,
   - said arithmetic means for modifying said digital output of said pulse counter also including control signal generator means for generating a plurality of control signals;
   - control network means coupled to said control signal generator means and responsive to said control signal for effecting a predetermined sequential transfer of data in singular bit order;
   - said control network means including a first, a second, and a third control network;
   - said first control network being connected between said digital output of said pulse counter means and said arithmetic means for effecting the transfer of output signals from said digital output of said pulse counter means to an input of said arithmetic means under the control of said control signals from said control signal generator means;
   - said second control network being connected between said addressable memory means and said arithmetic emans for effecting the transfer of a selected one of said data correction words from said addressable memory means to an input of said arithmetic means under the control of said control signals from said control signal generator;
   - said data correction words each comprising a plurality of data correction bits, the first bit of each data correction word being a sign bit, said addressable memory means having an output comprising a plurality of digital output signals consisting of said data correction bits; and
   - buffer storage means;
   - said third control network being connected between said arithmetic means and said output storage means for effecting the transfer of output signals from said arithmetic means to the input of said output storage means under the control of said control signal generator;
   - said buffer storage means being connected between an output of said third control network and an input of said arithmetic means, said arithmetic means including means for producing, in addition to the modified data signal, a carry-or-borrow sign, said carry-or-borrow signal being transferred to and stored for subsequent use in said buffer storage means;

said output storage means providing output signals comprising a digital representation of the data stored therein, said stored data being representative of the value of the linearized primary variable.

2. An integrating analog-to-digital converter as set forth in claim 1 wherein said arithmetic means comprises a one bit adder/subtractor;

said arithmetic means including means operable to selectively add-or-subtract depending upon the instruction of said sign bit.

3. An integrating analog-to-digital converter as set forth in claim 1 wherein said output storage means comprises a binary counter being operative to produce a binary digital output signal representative of the number of pulses applied to its input, said output signal being representative of the binary value of the linearized primary variable.

4. An integrating analog-to-digital converter as set forth in claim 3 including binary-to-BCD control means being operative to include said binary digital output signals into binary coded decimal form, BCD counter means comprising a plurality of flip-flops being operative to store therein the resultant bit data of said output storage means in BCD format.

5. An integrating analog-to-digital converter as set forth in claim 4 wherein said binary-to-BCD control means comprises means operative to condition said binary counter to count down to zero in binary format and, simultaneously, to further condition said BCD counter to count from zero in BCD format, said BCD format at the time said binary counter has reached said zero count, constituting a digital representation of a linearized characterization of said input signal.

6. An integrating analog-to-digital converter as set forth in claim 5 including an indicator, said indicator comprising means operative to provide a visual decimal display of said BCD format, said visual decimal display constituting a visual representation of a linearized characterization of said input signal.

7. An integrating analog to digital converter for providing a linearized digital representation of an analog input signal which is a nonlinear representation of a primary variable, said converter comprising;

pulse generating means for generating a series of equally time spaced pulses;

pulse counter means for producing a digital output representative of the number of pulses applied to its input;

control gating means for selectively connecting the output of said pulse generating means to the input of said pulse counter means;

integrating means for generating an output signal representative of the time integral of the input signals applied thereto;

switching means for applying an analog input signal to said integrating means to produce a first integrated output signal;

comparator means responsively coupled to said integrating means for actuating said control gating means whereby initiating transmission of pulses from said pulse generating means to the input of said pulse counter means at the beginning of said integration of said first input signal; said counter means being driven from a predetermined starting count to a full scale count in a first time interval beginning at the time said first integrated output signal is at a threshold level, said first integrated output signal varying from said threshold level to a second level during said first time interval;

means responsive to a full scale count in said counter means for actuating said switching means to apply a second, or reference, signal to said integrating means, said reference signal being of opposite polarity with respect to said analog input signal; said integrating means being operative to produce a second integrated output signal in response to said second signal varying from said second level to said threshold level during a second time interval immediately following said first time interval; said comparator means coupled to said integrating means being further responsive to the return of said second integrated signal to said threshold value for actuating said control gate means for terminating transmission of pulses from said pulse generating means to said counter means at the termination of said second time interval whereby said digital output of said pulse counter means at the end of said second time interval is representative of the value of said analog input signal;

linearizing means comprising addressable memory means having a plurality of data correction words addressably stored therein;

means responsive to said digital output of said pulse counter means for addressing said memory means for selecting a corresponding one of said data correction words;

arithmetic means responsive to said digital output of said pulse counter means and of said selected data correction word for modifying said digital output in accordance with said data correction word;

output storage means capable of having stored therein the modified digital output of said arithmetic means and being operative to provide a linearized representation of said primary variable, said linearizing means including input signal means, said input signal means for said linearizing means includes said pulse counter means;

said pulse counter means comprising a binary counter consisting of $(M+N)$ flip-flops, where M and N are any positive whole integers excluding zero, each of said $(M+N)$ flip-flops having stored therein a data bit representative of one of the binary states, said stored data bits constituting a digital representation of a nonlinearized process variable, said stored data bits also being value weighted as $M$ most significant bits and $N$ least significant bits;

said addressable memory having an address capability of $2^M$ combinations, said combinations each having at its address location one of said data correction words, each of said data correction words comprising a plurality of data correction bits, the value of said data correction bits being constant over a range of $2^N$ consecutive states of said binary counter, said data correction bits being arranged in a predetermined sequence consisting of a sign bit in the first sequential position consecutively followed by the remainder of the data correction word beginning with the least significant data bit and ending with the most significant data bit.

8. A digital linearizing system, said system including input signal means, said input signal means comprising a binary counter consisting of $(M+N)$ flip-flops, where $M$ and $N$ are any positive whole integers excluding zero, each of said $(M + N)$ flip-flops having stored therein a data bit representing one of the binary states, said stored data bits constituting a digital representation of a nonlinearized analog input variable, said stored data bits being value weighted as $M$ most significant data bits and $N$ least significant data bits, storage means consisting of an addressable memory, said memory having an address capability of $2^M$ combinations, said combinations each having at its address location a data correction word, said data correction word comprising a plurality of data correction bits, the value of said data correction bits being constant over a range of $2^N$ consecutive states of said binary counter, said data correction bits also being arranged in a predetermined sequence consisting of a sign bit in the first sequential position consecutively followed by the remainder of the data correction word beginning with the least significant data bit and ending with the most significant data bit, signal responsive means by which the memory is addressed by the $M$ most significant output signals from said binary counter, arithmetic means for effecting the arithmetic modification of said nonlinearized input variable, control signal generator means for producing a plurality of sequentially spaced control pulses, control network means coupled to said control signal generator means and being responsive to said control pulses for effecting a predetermined sequential transfer of data in singular bit order; said control network means including a first, a second and a third control network;

said first control network being responsive to a first one of said control pulses for connecting the output of said binary counter to the input of said arithmetic means, said first control network means being operative under control of said first of said control pulses to transfer the data bits stored in said binary counter to said arithmetic means;

second control network responsive to a second one of said control pulses for connecting the output of said addressable memory to the input of said arithmetic means, said second control network being operative under control of said second of said control pulses to transfer the data correction bits stored in said addressable memory to said arithmetic means;

third control network responsive to a third one of said control pulses for connecting an output of said arithmetic means to the input of an output storage means, said third control network means being operative under control of said third of said control pulses to transfer the sum-or-difference data bit stored within said arithmetic means to said output storage means;

buffer storage means being connected between an output of said third control network and an input of said arithmetic means, said arithmetic means including means for producing, in addition to the modified data signal, a carry-or-borrow signal, said carry-or-borrow signal being transferred to and stored for subsequent use in said buffer storage means; said output storage means having a digital output representative of the value of a linearized characterization of said input signal.

9. A digital linearizing system as set forth in claim 8 wherein said arithmetic means comprises a one-bit adder/subtractor; said arithmetic means including means operable to selectively add-or-subtract depending upon the instruction of said sign bit.

10. A digital linearizing system as set forth in claim 8 wherein said output storage means comprises a binary counter of (M+N) flip-flops, each of said flip-flops comprising means for storing individual ones of said reluctant bits.

11. A digital linearizing system as set forth in claim 10 including binary to BCD control means wherein data bits of binary form are encoded into binary coded decimal form, BCD counter means comprising a plurality of flip-flops sufficient to store therein the resultant bit data of said output storage means in BCD format.

12. A digital linearizing system as set forth in claim 11 wherein said binary to BCD control means comprises means operative to condition said binary counter to count down to zero in binary format and also comprises means operative to condition said BCD counter to count up from zero in BCD format, said BCD format at the time said binary counter has reached said zero count, constituting a digital representation of a linearized characterization of said input signal.

13. A linearizing analog to digital converter for providing a linearized digital representation of an analog input signal which is a nonlinear representation of a primary variable, said converter comprising input terminal means arranged to be connected to a source of an analog input signal, analog to digital converter means including a pulse counter means for producing a digital output representative of the digital value of said analog input signal;

linearizing means comprising addressable memory means having a plurality of data correction words addressably stored therein;

means responsive to said digital output of said pulse counter means for addressing said memory means for selecting a corresponding one of said data correction words;

arithmetic means responsive to said digital output of said pulse counter means and of said selected data correction word for modifying said digital output in accordance with said data correction word; and output storage means capable of having stored therein the modified digital output of said arithmetic means being operative to provide a linearized representation of said primary variable, said arithmetic means for modifying said digital output of said counter means also includes control signal generator means for generating a plurality of control signals;

control network means coupled to said control signal generator means and responsive to said control signal for effecting a predetermined sequential transfer of data in singular bit order;

said control network means including a first, a second, and a third control network;

said first control network being connected between said digital output of said pulse counter means and said arithmetic means for effecting the transfer of output signals from said digital output of said pulse counter means to an input of said arithmetic means under the control of said control signals from said control signal generator means;

said second control network being connected between said addressable memory means and said arithmetic means for effecting the transfer of a selected one of said data correction words from said addressable memory means to an input of said arithmetic means under the control of said control signals from said control signal generator;

said data correction words each comprising a plurality of data correction bits, the first bit of each data correction word being a sign bit, said addressable memory means having an output comprising a plurality of digital output signal consisting of said data correction bits; and buffer storage means;

said third control network being connected between said arithmetic means and said output storage means for effecting the transfer of output signals from said arithmetic means to the input of said output storage means under the control of said control signals from said control signal generator;

said buffer storage means being connected between an output of said third control network and an input of said arithmetic means, said arithmetic means including means for producing, in addition to the modified data signal, a carry-or-borrow signal, said carry-or-borrow signal being transferred to and stored for subsequent use in said buffer storage means;

said output storage means providing output signals comprising a digital representation of the data stored therein, said stored data being representative of the value of the linearized primary variable.

14. A linearizing analog to digital converter as set forth in claim 13 wherein said arithmetic means includes a one bit adder/subtracter, and means operable to control said one bit adder/subtracter to selectively add or subtract depending upon the instruction of said sign bit.

* * * * *